United States Patent

Das et al.

[11] Patent Number: 5,824,429
[45] Date of Patent: Oct. 20, 1998

[54] PEROVSKITE ELECTRODES AND HIGH TEMPERATURE FUEL CELLS FITTED THEREIN

[75] Inventors: Dasarathi Das, Bombay, India; Jimmie Edwards, Toledo, Ohio; Lutz Kindermann, Aachen, Germany; Klaus Hilpert, Jülich, Germany; Günther Pütz, Jülich, Germany

[73] Assignee: Forschungszentrum Julich GmbH, Julich, Germany

[21] Appl. No.: 682,508

[22] PCT Filed: Jan. 10, 1995

[86] PCT No.: PCT/DE95/00026

§ 371 Date: Oct. 29, 1996

§ 102(e) Date: Oct. 29, 1996

[87] PCT Pub. No.: WO95/19053

PCT Pub. Date: Jul. 13, 1995

[30] Foreign Application Priority Data

Jan. 11, 1994 [DE] Germany ............... 44 00 540.7

[51] Int. Cl.⁶ ................................... H01M 4/90
[52] U.S. Cl. ............................. 429/44; 429/30
[58] Field of Search ........................... 429/30, 44

[56] References Cited

U.S. PATENT DOCUMENTS 5,543,239  8/1996  Virkar et al. ..................... 429/44 X

FOREIGN PATENT DOCUMENTS 4-230955   8/1992  Japan.
2 037 432  7/1980  United Kingdom.

OTHER PUBLICATIONS

Extended Abstracts, vol. 89, No. 2, 1989 Princeton, New Jersey, p. 797 A. Tsunoda et al, 'Effects of Additions on the Resistance of La0,9Sr0,1MnO3 Cathode.

Tsunoda et al., Patenet Abstracts of Japan, vol. 16, No. 162 (E–1192), p. 105, corresponds to Japanese kokai No. JP4–12457, Jan. 1992.

*Primary Examiner*—Stephen Kalafut
*Attorney, Agent, or Firm*—Herbert Dubno; Jonathan Myers

[57] ABSTRACT

A boundary layer structure, useful in a fuel cell, includes a solid electrolyte and an electrode. The electrode consists essentially of a perovskite base material and a platinum group metal oxide addition, along the boundary between the perovskite and the electrolyte. Iridium oxide is a preferred metal oxide addition material, while a preferred perovskite is lanthanum ferrite, which contains Sr and either Co or Mn.

5 Claims, 4 Drawing Sheets

| CATHODE | ELECTROLYTE | ANODE |
|---|---|---|
| PEROVSKITE | z.B. $ZrO_2 + 8\,mol\%\,Y_2O_3$ | $Ni/ZrO_2$ CERMET OR PEROVSKITE |

FIG.1

PEROVSKITE ELECTRODES AND HIGH TEMPERATURE FUEL CELLS FITTED THEREIN

FIELD OF THE INVENTION

The invention relates to a perovskite based electrode with solid electrolyte contact which is especially suitable for high temperature fuel cells.

BACKGROUND OF THE INVENTION

Solid electrolyte fuel cells generally operate with operating temperatures of about 950° to 1000° C. A reduction of the operating temperature to about 800° C. is sought. The solid electrolyte used is as a rule $Y_2O_3$ stabilized $ZrO_2$ (YsZ). The solid electrolyte, which in classical concepts serves simultaneously as a substrate carrier and usually has a thickness of 100 to 150 μm is coated on both sides with different materials as electrodes (compare FIG. 1): as a cathode, usually perovskite as, for example, $(La_{1-x}Sr_x)MnO_3$ is applied, as the anode an $Ni/ZrO_2$ cermet is applied.

The high operating temperatures are required in order to maintain the energy losses which arise from the energy conversion within tolerable limits. They have, however, the drawback that the construction of the cell and the materials used must conform to high standards. A special problem arises because of chemical exchange at the boundary surfaces of the different material pairs which can be detrimental. These can result at the boundary layer between the cathode and the solid electrolyte, in the formation of new phases like, for example, $SrZrO_3$ and $La_2Zr_2O_7$ which are detrimental to cell operation. The selection of suitable perovskites is thus made difficult.

OBJECT OF THE INVENTION

The object of the invention is therefore a reduction in the chemical exchange between the perovskites serving as electrodes and the solid electrolytes and optionally an improvement in the electrochemical characteristics of the electrodes.

SUMMARY OF THE INVENTION

This object is achieved through an inhibiting platinum group metal doping in the perovskite bounding the electrolyte.

Namely, it has been surprisingly found that the reactivity of perovskites with respect to solid electrolyte masses, especially those of a $ZrO_2$—$Y_2O_3$ basis can be significantly reduced by a platinum group metal doping of the perovskite which contains platinum group metal (ions) incorporated in the lattice. It has been found further that certain platinum group metals, like for example iridium, which usually need the influence of oxygen are highly volatile as oxides, are found in perovskite. Thus doped electrodes additionally show improved electrochemical characteristics.

The customary doping amounts which are usable can go to above 1% but advantageously is selected in the range of 10 to $10^3$ ppm. Of the platinum group metals, iridium and ruthenium are preferred, these especially being received in oxidic form by perovskite. The doping can extend over the entire volume of the electrode but especially important however is the boundary region with the solid electrolyte.

Indeed, perovskite electrodes in a variety of compositions and with various dopings are known (see for example EP 0 373 745 A2) although to date no platinum group metal doping especially at the boundary region with the electrolyte has been contemplated nor has its stabilizing effect been disclosed. In DE 28 37 228 C2 one can find only a suggestion of the addition of platinum or a platinum alloy to chromium-containing electrodes with a perovskite structure to improve the catalytic setting of the exhaust gas equilibrium without further specification. The general knowledge of the waste gas catalytic effect of platinum and platinum alloys follow proposals from 1978 and in no case is a suggestion of the stabilizing effect of a doping of perovskite electrodes with platinum group metals in an oxidized form at the boundary region with a solid electrolyte.

To produce the doping according to the invention, platinum group metals with high oxide vapor pressure (as for example iridium) are incorporated from a gas phase in the material. For this purpose the perovskite is subjected, for example, in air or in another oxygen-containing atmosphere to elevated temperatures (about 600° to 1000° C.) over long periods in the course of exposure to the oxide vapor. Alternatively, the desired doping can be achieved by impregnation and heat treatment or by suitable additives already at the electrode production stage.

Especially significant in the framework of the present invention is the use of perovskite cathodes for high temperature fuel cells, although the invention can also be used for the perovskite provided for the anodes which are doped with platinum group metals.

The doping of the invention is usable for perovskite types and mixtures which are provided for fuel cells, for example perovskites based on $LaMnO_3$, $LaCoO_3$, $LaFeO_3$, $LaCrO_3$ and the like.

Perovskites based on lanthanum ferrite were tested.

With solid electrolytes $Y_2O_3$ containing $ZrO_2$ masses were generally used. The reactivity reduction of perovskite electrodes by platinum group metal doping (especially in oxidic form) can, it will be self-understood, be used with other oxidic masses serving as solid electrolytes, as, for example, mixed oxides based on Gd, Ce and doped $BaCeO_3$.

It will be self-understood that the invention is not limited to fuel cells but can be used in all cases for high temperature operating boundary layer structures in which materials of the perovskite type and high temperature resistant oxide masses, especially amphoteric to weakly basic materials, contact one another.

The reduction or avoidance of chemical exchange according to the invention enables perovskites to be used with improved electrical characteristics at high operating temperatures (950° to 1000° C.) or longer operating periods to be achieved.

Furthermore, the use of perovskites, like for example $(La_{1-x}Sr_x)$—$(Fe_{1-y}Co_y)O_3$ is possible. These have attractive electrical characteristics even at lower temperatures (all about 500° to 900° C.) and allow economical cell operation: a reduction of the cell temperature whereby the thickness of the YsZ can be reduced significantly below 100 μm, enables other solid electrolytes than YsZ to be used, with the priority goals of cost reduction and increased operating times.

BRIEF DESCRIPTION OF THE DRAWINGS

Below tests to clarify the invention are supplied. Reference may be made to the accompanying drawing; they show:

FIG. 1 is a diagram for an electrode/electrolyte arrangement of a fuel cell;

FIG. 3 is an X-ray diagram for

(1)

(2),

(3), and

Figure 4:
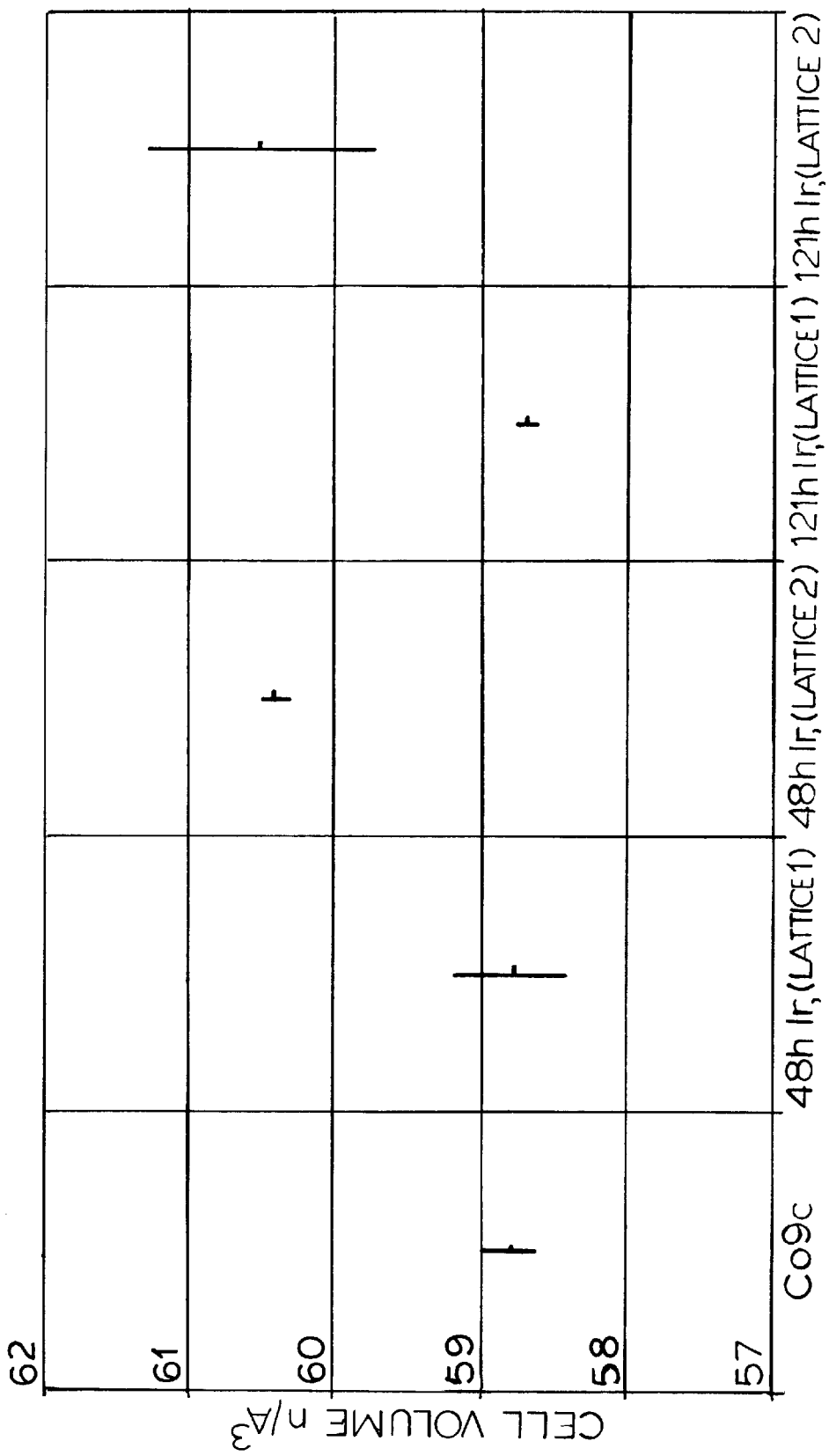

FIG. 4 is a graph of the cell volume after precipitation of the composition $(La_{0.6}Sr_{0.4})(Fe_{0.8}Mn_{0.2})O_{3-\delta}$ over 48 hours and 121 hours in an Ir atmosphere.

Figure 2:
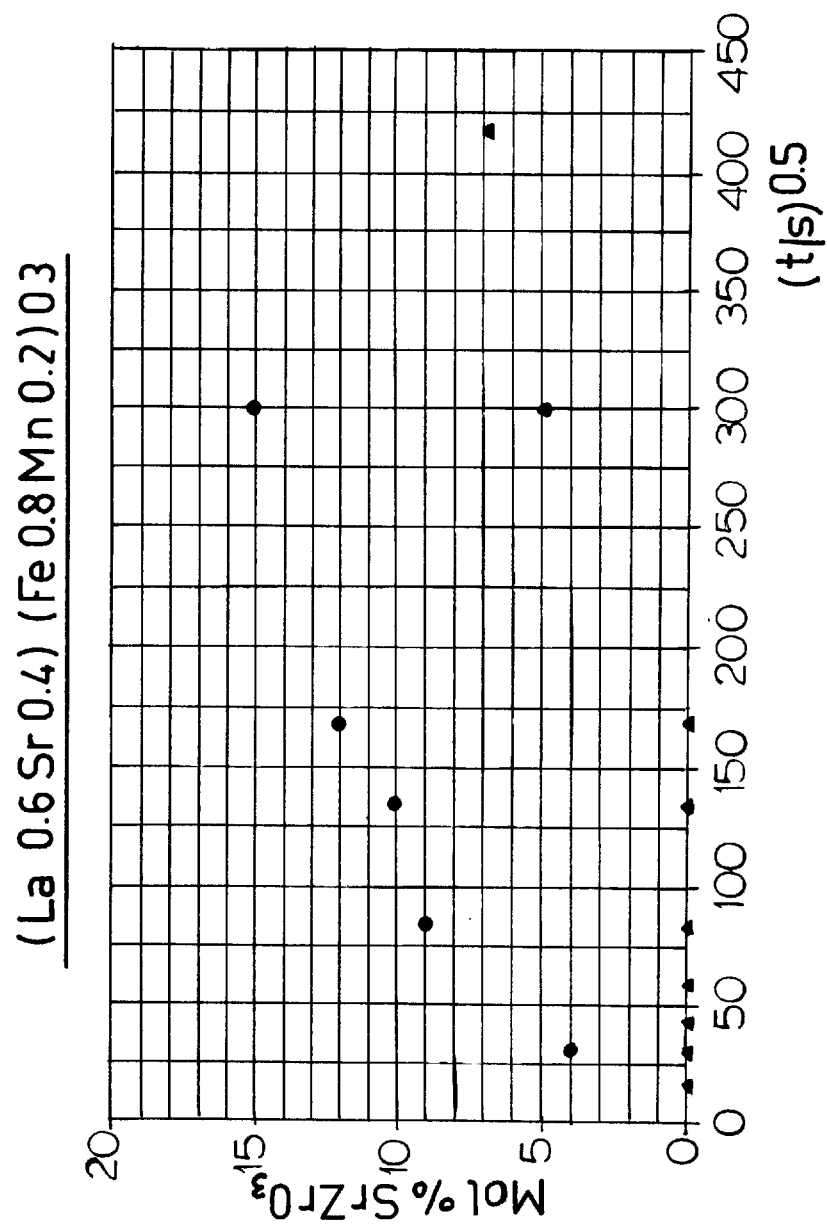
FIG. 2 is a graph of the $SrZrO_3$ formation in a powder mixture of YsZ and perovskite, $La_{0.6}Sr_{0.4}Fe_{0.8}Mn_{0.2}O_{3-\delta}$, with a ▲ representing Ir doping and representing no In doping, as a function of time.
Figure 3:
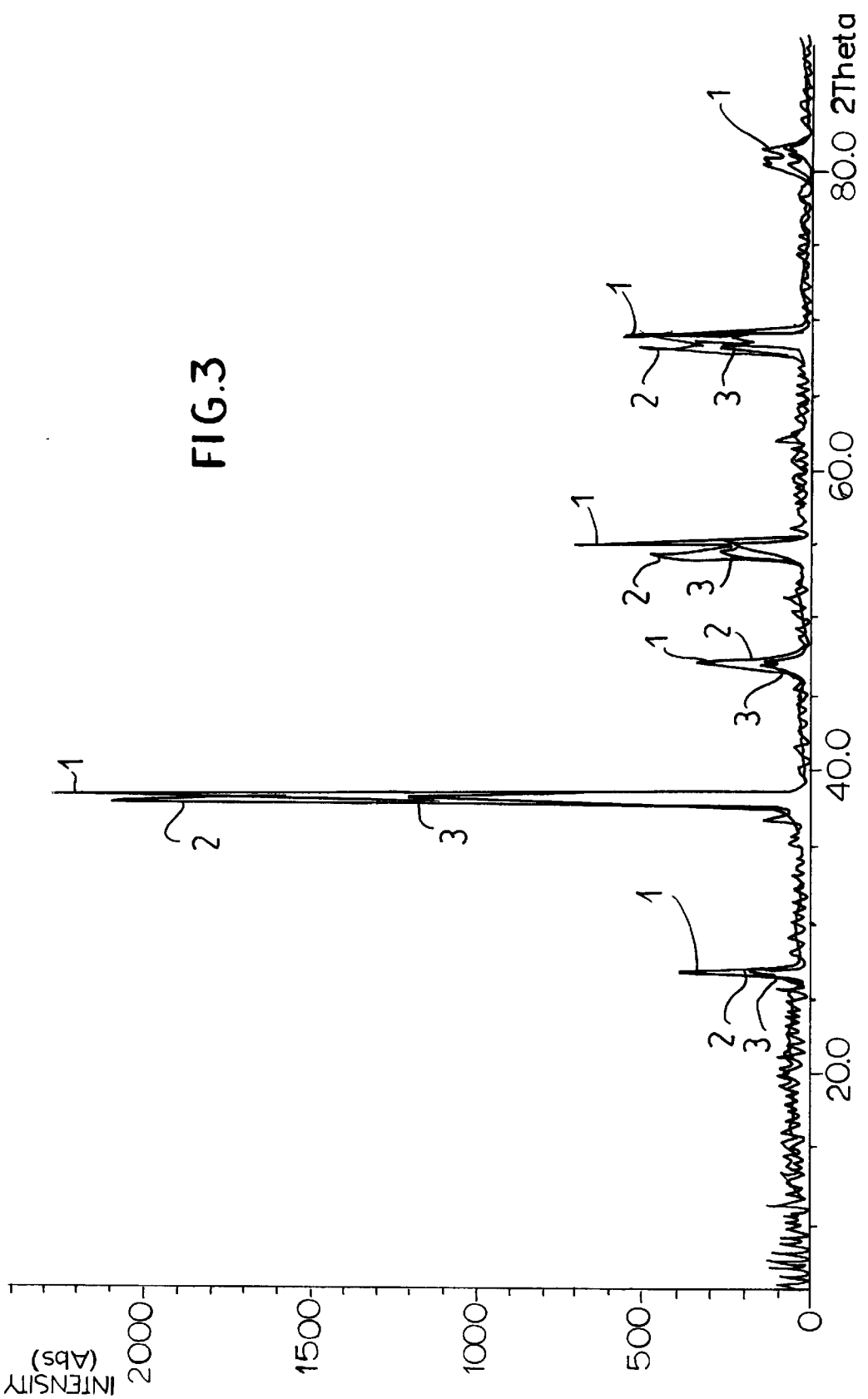

Perovskite powder of different compositions (Table 1) is activated for 48 hours or 121 hours at 900° C. together with iridium sheet in air above the gas phase. The thus pretreated samples are mixed with the electrolyte material 8YsZ ($ZrO_2$ stabilized with 8 mol % $Y_2O_3$) in equimolar proportions, pressed into pellets and tempered or aged at 1000° C. for different times. With the aid of X-ray diffraction the formation of reaction products ($SrZrO_3$ or $CaZrO_3$) determined after 25 hours and 48 hours of aging. The results are collected in Table 1. As one can see, the iridium doped samples have a far lesser tendency toward reaction with the electrolyte than the untreated samples. The curve of $SrZrO_3$ formation versus time has been provided in FIG. 2 from which the difference is clear.

As the following tests indicate, with an iridium charging of the perovskite, there is a detectable incorporation of platinum metal in the lattice. The perovskite $(La_{0.6}Sr_{0.4})_{0.9}Fe_{0.8}Co_{0.2}O_{3-\delta}$ is selected as a starting material and is calcined for 48 hours at 900° C. in an oxygen atmosphere.

In parallel thereto, two samples of the same composition are aged in the same oxygen atmosphere in the presence of iridium at 900° C. for 48 hours or 121 hours. The subsequently completed X-ray diffraction tests indicate for the Ir charged samples, a clean separation of the perovskite which with the help of computer calculation can be divided into two different lattice types (Table 2). In both of the iridium-charged samples one finds aside from the orthorhombic starting lattice a rhomboidal lattice with significantly enlarged cell volume (Table 2 and FIG. 4). This indicates that iridium has been incorporated in the perovskite lattice.

Additionally, perovskite compositions, $La_{0.6}Sr_{0.4}Fe_{0.8}Co_{0.2}O_{3-\delta}$ and $(La_{0.6}Sr_{0.4})_{0.9}Fe_{0.8}Mn_{0.2}O_{3-\delta}$, are subjected with relatively high iridium concentrations (up to several weight %) are subjected over extended periods (226 hours and 432 hours) to 900° C. in an oxygen atmosphere. The subsequent analysis gives an Ir loss of a maximum of 20%. Finally the iridium can be determined to be truly built into the lattice of the perovskite as a doping and there can be effective counter to the reactivity to the solid electrolyte.

In addition to the doping experiments above the vapor phase, a perovskite of the composition $La_{0.6}Sr_{0.4}Fe_{0.8}Mn_{0.2}O_{3-\delta}$ can have an iridium doping synthesized directly from the components.

As the starting material nitrates of the corresponding metal components of the perovskite for example Ir(III) oxide ($Ir_2O_3$) can serve. All components are homogenized in an aqueous solution, dried and then aged at 1200° C. for 48 hours in air to generate the perovskite lattice. With an aid of a parallel iridium determination by means of nutrient activation analysis and spark source mass spectrometry, the iridium content in both cases can be determined as about 200 ppm. The perovskite contained is mixed in equimolar proportions with YsZ, pressed to pellets and aged for 72 hours at 1000° C. The result is given in Table 1.

TABLE 1

Amount of formed $SrZrO_3$ or $CaZrO_3$ in equimolar perovskite/YsZ - powder mixture with and without Ir additive to perovskite after aging at 1000° C. for 48 hours, 25[1] hours and 72[2] (YsZ = with 8 Mol % $Y_2O_3$ stabilized $ZrO_2$)

| perovskite | Mol % $SrZrO_3$ without Ir Addition | Mol % $SrZrO_3$ with Ir Addition 48 h°) | Mol % $SrZrO_3$ with Ir Addition 121.5 h°) |
|---|---|---|---|
| $(La_{0.6}Sr_{0.4})(Fe_{0.8}Co_{0.2})O_{3-\delta}$ | 35 | 16 | 14 |
| $(La_{0.6}Sr_{0.4})(Fe_{0.8}Co_{0.2})O_{3-\delta}$ | 16 | 8 | k.V. |
| $(La_{0.6}Sr_{0.4})_{0.9}(Fe_{0.8}Co_{0.2})O_{3-\delta}$ [1) ] | 36 | 13 | 10 |
| $(La_{0.6}Sr_{0.4})_{0.9}(Fe_{0.8}Mn_{0.2})O_{3-\delta}$ [1) ] | 8 | 0 | k.V. |

| perovskite | Mol % $CaZrO_3$ without Ir Addition | Mol % $CaZrO_3$ with Ir Addition 48 h°) | Mol % $CaZrO_3$ with Ir Addition 121,5 h°) |
|---|---|---|---|
| $(La_{0.6}Ca_{0.4})(Fe_{0.8}Co_{0.2})O_{3-\delta}$ | 28 | 8 | k.V. |
| $(La_{0.6}Ca_{0.4})_{0.9}(Fe_{0.8}Co_{0.2})O_{3-\delta}$ | 20 | 7 | k.V. |

| perovskite | Mol % $SrZrO_3$ without Ir Addition | Mol % $SrZrO_3$ with Ir Addition, 200 ppm |
|---|---|---|
| $(La_{0.6}Sr_{0.4})(Fe_{0.8}Mn_{0.2})O_{3-\delta}$ [2) ] | 16 | 0 |

*Duration of activation of perovskite in the Ir crucible at 900° C.
k.V. = no test carried out.

TABLE 2

Change in lattice parameters of a perovskite of the composition $(La_{0.6}Sr_{0.4})_{0.9}Fe_{0.8}Co_{0.2}O_{3-\delta}$ after aging with Iridium at 900° C. for 48 hours and 121 hours
Lattice Parameter of Iridium Activated Co9c - Perovskite

|  |  | Co9c + 48 h Ir | | Co9c + 121 h Ir | |
| --- | --- | --- | --- | --- | --- |
|  | Co9c | Lattice 1 | Lattice 2 | Lattice 1 | Lattice 2 |
| Lattice Type | Orthorhombic | Orthorhombic | Rhombohedral | Orthorhombic | Rhombohedral |
| Cell volumen/Å$^3$ | 58.8(2) | 58.8(4) | 60.4(1) | 58.7(1) | 60.5(8) |
| Lattice parameter /A | a = 3.885(5)<br>b = 3.884(5)<br>c = 3.899(12) | a = 3.892(10)<br>b = 3.874(7)<br>c = 3.902(26) | a = b = c = 3.924(2) | a = 3.891(5)<br>b = 3.887(11)<br>c = 3.879(3) | a = b = c = 3.926(18) |
| Angle | $\alpha = \beta = \gamma = 90°$ | $\alpha = \beta = \gamma = 90°$ | $\alpha = \beta = \gamma = 90, 20°(4)$ | $\alpha = \beta = \gamma = 90°$ | $\alpha = \beta = \gamma = 90, 04°(31)$ |
| 2 Theta zero point/A | 0.031(60) | 0.030 solid | 0.042 solid | 0.030 solid | 0.092(216) |

We claim:

1. A high temperature fuel cell which comprises:
   (1) a cathode;
   (2) an anode; and
   (3) a solid electrolyte in electrical contact with said cathode and said anode, wherein said cathode consists essentially of:
      (a) a perovskite base material having a lattice structure; and
      (b) a platinum group metal oxide addition to the lattice structure of said perovskite base material, said platinum group metal oxide addition doping the perovskite base material in order to inhibit electrical contact along a boundary between said perovskite base material and said solid electrolyte thereby stabilizing said perovskite base material against additional phase formations which are detrimental to fuel cell operation.

2. A high temperature fuel cell which comprises:
   (1) a cathode;
   (2) an anode; and
   (3) a solid electrolyte in electrical contact with said cathode and said anode, wherein said cathode consists essentially of:
      (a) a perovskite base material having a lattice structure; and
      (b) as a sole platinum group metal oxide addition to the lattice structure of said perovskite base material, an iridium oxide addition, said iridium oxide addition doping the perovskite base material in order to inhibit electrical contact along a boundary between said perovskite base material and said solid electrolyte thereby stabilizing said perovskite base material against additional phase formations which are detrimental to fuel cell operation.

3. A boundary layer structure which comprises:
   (1) a solid electrolyte; and
   (2) an electrode in electrical contact with said solid electrolyte and which consists essentially of:
      (a) a perovskite base material having a lattice structure; and
      (b) a platinum group metal oxide addition, said platinum group metal oxide added along a boundary between said perovskite base material and said solid electrolyte in order to inhibit electrical contact between said perovskite base material and said solid electrolyte thereby stabilizing said perovskite base material against phase formations which result from said electrical contact.

4. A boundary layer structure which comprises:
   (1) a solid electrolyte; and
   (2) an electrode in electrical contact with said solid electrolyte and which consists essentially of:
      (a) a perovskite base material having a lattice structure; and
      (b) as a sole platinum group metal oxide addition to the lattice structure of said perovskite base material, an iridium oxide addition, said iridium oxide added along a boundary between said perovskite base material and said solid electrolyte in order to inhibit electrical contact between said perovskite base material and said solid electrolyte thereby stabilizing said perovskite base material against phase formations which result from said electrical contact.

5. An electrode for use in a solid electrolyte fuel cell which consists essentially of:
   (a) lanthanum ferrite containing Sr and either Co or Mn as a perovskite base material having a lattice structure; and
   (b) as a sole platinum group metal oxide addition to the lattice structure of said perovskite base material, an iridium oxide addition, said iridium oxide addition doping the perovskite base material.

* * * * *